March 3, 1964  J. DUMPIS  3,123,245
CORE PLUG REPLACEMENT
Filed Sept. 4, 1962
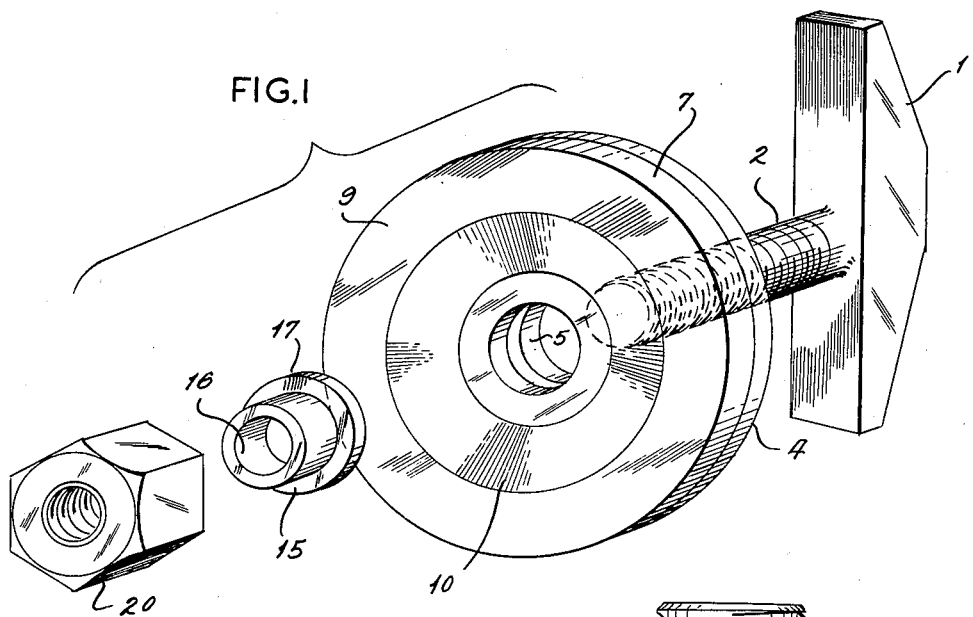
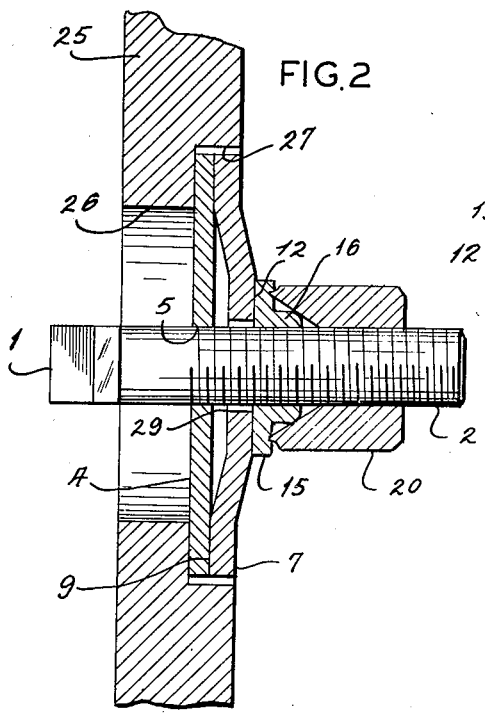
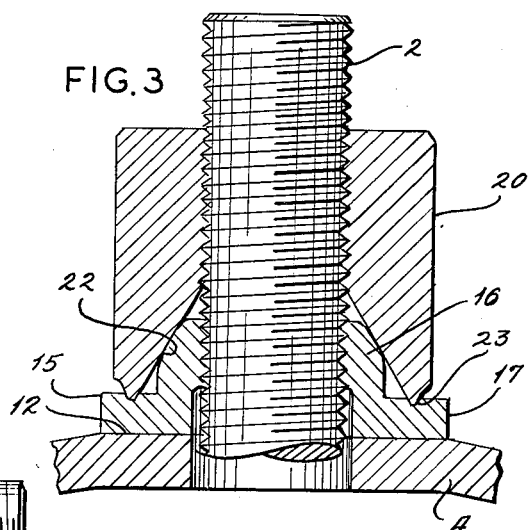
INVENTOR:
JANIS DUMPIS
Sutherland Polster + Taylor
ATTORNEYS, United States Patent Office 3,123,245
Patented Mar. 3, 1964

3,123,245
CORE PLUG REPLACEMENT
Janis Dumpis, St. Ann, Mo., assignor to Champ-Items, Inc., St. Louis, Mo., a corporation of Missouri
Filed Sept. 4, 1962, Ser. No. 221,137
4 Claims. (Cl. 220—24.5)

This invention relates to a core plug replacement and more specifically to the manner of providing an effective liquid tight seal between the backing plate and threaded stem for anchoring a device of this kind in place over or in a core hole of an engine casting.

Engine castings usually contain water jackets and connecting passages for cooling. In order to form a casting of this kind the molds must contain and support preformed cores about which the molten metal can flow. Some passages in the final casting are blind, that is, open at only one end. However, the cores forming this passage must be supported near both ends in order to prevent shifting. Where such practice is followed, a core hole is left in the finished casting near the closed end. Usually these core holes are bored out round and a core plug of sheet metal pressed in to close the hole.

It frequently occurs that after the engine has been in use for awhile, these core plugs develop leaks. It is also the case that the leaky plug will be located in some position on the engine which makes accessibility difficult and replacement by pressing, or driving, in a new plug impossible without removing parts of the engine or accessory equipment mounted in the engine compartment. To avoid these difficulties, replacement core plugs have been devised which are anchored in place by threaded fasteners capable of being operated by wrenches and within a very limited space. These replacement plugs save a great deal of time and labor, but cannot be depended upon in every instance to stop the leak. There are several reasons for this among which is the wide use of antifreeze solutions that are of low surface tension and difficult to seal in and the wide use of pressurized cooling systems for engines. These are some of the reasons, other than purely mechanical ones, which make effective and reliable sealing by replacement plugs more exacting than ever before.

It is an object of this invention to provide a replacement core plug which is effective in its sealing function.

It is another object of this invention to provide a replacement core plug which has threaded fastenings, or operators, with means to effectively seal against leakage in or around these threaded parts as well as around the plug.

According to this invention the replacement core plug has parts for closing the core hole and parts to act as a threaded fastening to maintain the parts for closing the core hole securely in place. Individual seals are provided to prevent leakage through or between any of these parts. It is contemplated that these seals will be separate, but this is not absolutely required.

Other objects and advantages of this invention will appear from the following detailed description which is in such clear, concise and exact terms as will enable any person skilled in the art to make and use the same when taken in conjunction with the accompanying drawings, forming a part thereof, and in which:

FIG. 1 is an exploded view in perspective illustrating the arrangement and construction of the individual parts of this invention;

FIG. 2 is a transverse sectional view of the same parts in FIG. 1 assembled in a core hole of a water jacket wall of an engine but before final tightening; and FIG. 3 illustrates on an enlarged scale the function of the seal for the threads on the fastening for the core plug after being tightened.

In the accompanying drawings, FIG. 1 shows the individual parts of a structure, according to this invention, and the order of their assembly into a complete device. In this view, there is a T bolt with a head 1 and a threaded stem 2. Stem 2 receives a plurality of elements including a gasket 4 apertured at 5 to receive the stem 2. Superposed upon the gasket 4 is the metal disk 7. Around the metal disk 7 is a flat peripheral flange 9 extending inwardly of the periphery of the disk 7 to a dished central portion 10. Around the aperture 8, the dished portion 10 is flattened to bear against the flat inner surface of a collar 17 on bushing 15. A central aperture 16 in the bushing 15 has a slidable fit with the stem 2 of the T bolt. Preferably the bushing 15 is of a ductile material. Such a material can be any one of the soft metals, for example, but it has been found that a commercial grade of nylon possesses superior characteristics when performing the function of this part as hereinafter described. Stem 2 also receives a threaded nut, such as 20, for clamping the aforementioned parts in place. As shown in FIG. 3, the nut is formed with a conical seat 22 concentric with the threads and extending from the threads outwardly to a narrow rim 23.

Operation

FIG. 2 illustrates a water jacket wall 25 with a core hole 26 counterbored at 27 to provide a flat seat. The core hole 26 is originally closed by a cup-shaped plug, or the like, wedged into the core hole 26, or by a Welsh plug wedged against the seat 27. If leakage develops about these types of plugs, replacement becomes necessary and often times the plugs are in such a position on the engine as to be relatively inaccessible. In some cases, however, in spite of this it is possible to pry out the leaking plug and replace by the plug herein described. After the original plug has been removed, the above-described parts in FIG. 1 are loosely assembled upon the stem 2. By gripping the end of the stem, the T head 1 of the bolt is tilted and inserted through the hole 26. The nut 20 is then run-up hand tight, in which position it is shown in FIG. 2. With the parts in this position, the final step is tightening the nut 20 to clamp the gasket 4 securely beneath the flange portion 9 of the disk 7. The clamping force of the nut 20 acts upon the bushing 15 to force the flange 17 hard against the flattened portion 12 of the disk 7. At the same time, the conical seat 22 on the inner surface of the nut 20 causes the bushing 15 to be deformed so that its outer surface forms a tapered seat against the seating surface 22 and its inner surface flows into the threads of the stem 2.

When finally secured in place, the replacement plug does an effective sealing job at the edges of the hole 26 by forcing the gasket 4 firmly against the inner peripheral edge of the hole 26 and against the flat surface in the counterbore 27. Although there is room between the stem 2 and the gasket 14 as at 29 for leakage along the stem 22, this path of leakage is effectively sealed by the nylon bushing 15.

The nylon bushing 15 coacts with the conical seat 22 in the nut 20 to seal against leakage between the threads of the nut and the threads of the stem 2. Leakage between the conical seat 22 and the bushing 15 is prevented by the mating conical surface formed on the bushing 15 by the conical seat 22 and by the fact that the narrow rim 23 forms its own seat in the plane surface of the flange 17 of the bushing. At the same time, the flange 17 is subject to not only the clamping force of the conical seat but also the clamping force produced by the rim 23 along a narrow circular band adjacent the outer periphery of the flange 17 so as to force the outer periphery of the flange against the flat portion 12 forming a seat on the disk 7. Thus, a plurality of sealing zones are provided surrounding the stem 2, any one of which is effective if another fails.

Changes in and modifications of the construction described may be made without departing from the spirit of my invention or sacrificing its advantages.

Having thus described the invention, what is claimed and desired to be secured by Letters Patent is:

1. In a replacement type of core plug for a core hole in a water jacket having (a) threaded stem, (b) an anchor on said stem adapted to hold the stem in said core hole, (c) a circular disk on said stem, and (d) nut means on said threaded stem to clamp said disk in place over said core hole in the water jacket, the improvement comprising,
   (1) a gasket adapted to seal the joint between said disk and water jacket when clamped therebetween,
   (2) a bushing-like member of ductile material having a flange portion seated on the outer surface of said disk around said stem and a cylindrical portion of smaller diameter extending along said stem, and
   (3) a conical seat in said nut means surrounding the cylindrical portion of said bushing-like member adapted to wedge said portion of said member into the threads on said stem and form a seating surface on said member complementary to said conical seat when said nut means is tightened.

2. In a replacement type of core plug for a core hole in a water jacket having (a) threaded stem, (b) an anchor on said stem adapted to hold the stem in said core hole, (c) a circular disk on said stem, and (d) nut means on said threaded stem to clamp said disk in place over said core hole in the water jacket, the improvement comprising,
   (1) a gasket adapted to seal the joint between said disk and water jacket when clamped therebetween,
   (2) a bushing-like member of ductile material having a flange portion seated on the outer surface of said disk around said stem and a cylindrical portion of smaller diameter extending along said stem, and
   (3) a narrow rim on the inner face of said nut means formed in part by a generally concave seating surface extending from said rim inwardly to the threaded hole in said nut means, said seating surface being adapted to surround the cylindrical portion of said bushing-like member and when tightened wedge said portion of said member into the threads on said stem and form a seating surface on said member complementary to said concave seating surface when said narrow rim engages and clamps said flange portion on said circular disk.

3. The combination as defined in claim 2 in which the ductile material in said bushing-like material is nylon.

4. In a replacement type of core plug for a core hole in a water jacket having (a) a threaded stem, (b) an anchor on the end of said stem adapted to hold the stem in a core hole, (c) a circular disk on said stem, and (d) nut means on said threaded stem to clamp said disk in place over the core hole in the water jacket, the improvement comprising,
   (1) a gasket adapted to seal the joint between said disk and water jacket when clamped therebetween, and
   (2) a bushing-like member of ductile material having a flanged portion seated on said disk around said stem and adapted to seal against leakage between said nut means and said disk when clamped therebetween, and around portion of smaller outside diameter extending along said stem toward said nut means from said flange portion at least partially crushed between said nut means and said flange portion and wedged into the threads of said stem to stop leakage along said stem.

References Cited in the file of this patent
UNITED STATES PATENTS

| | | |
|---|---|---|
| 2,540,145 | Stevens | Feb. 6, 1951 |
| 2,825,482 | Evans | Mar. 4, 1958 |
| 3,019,950 | Callegari | Feb. 6, 1962 |